T. E. MURRAY.
METER TESTING SERVICE CUT-OUT.
APPLICATION FILED DEC. 8, 1909.
991,004.
Patented May 2, 1911.
4 SHEETS—SHEET 1.
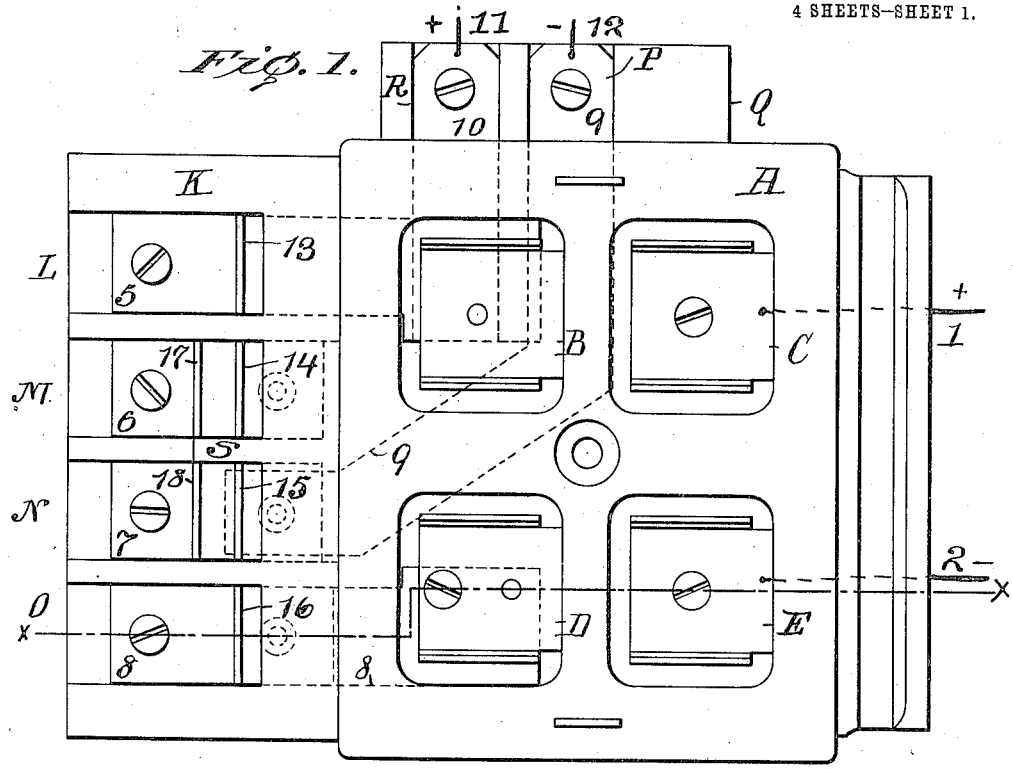
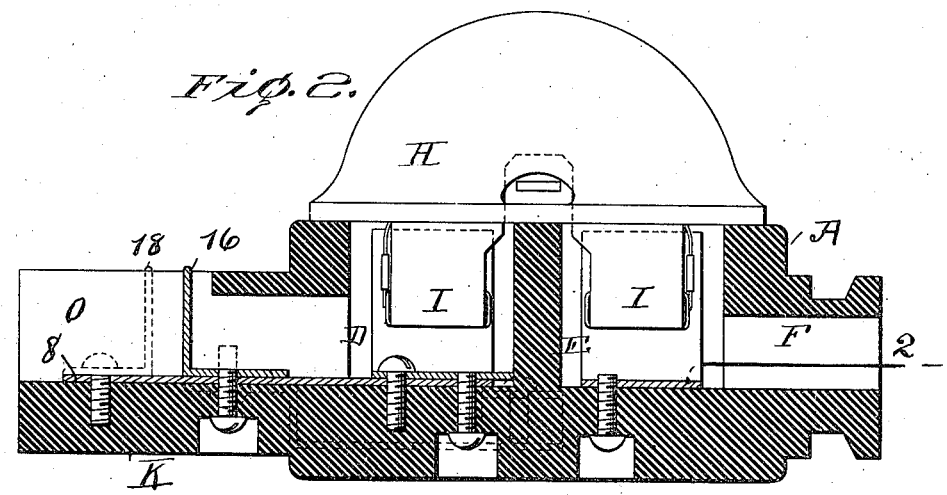
WITNESSES:
Gertrude T. Porter
May T. McGarry
INVENTOR
Thomas E. Murray
BY Paul Benjamin
his ATTORNEY T. E. MURRAY.
METER TESTING SERVICE CUT-OUT.
APPLICATION FILED DEC. 8, 1909.
991,004.
Patented May 2, 1911.
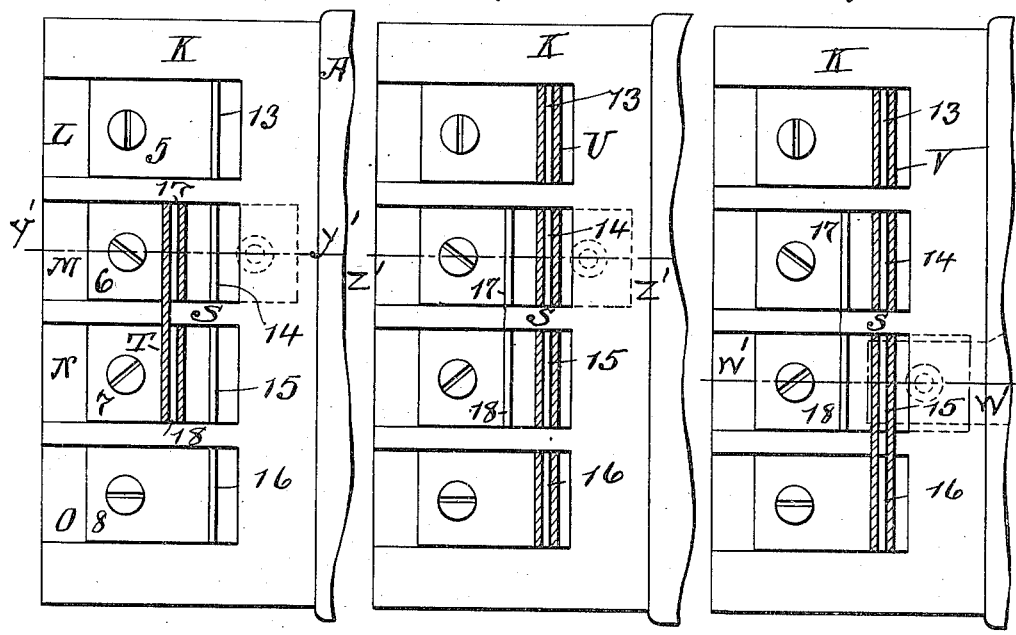
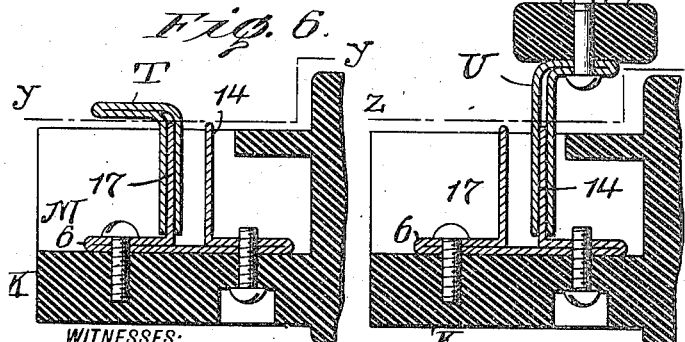
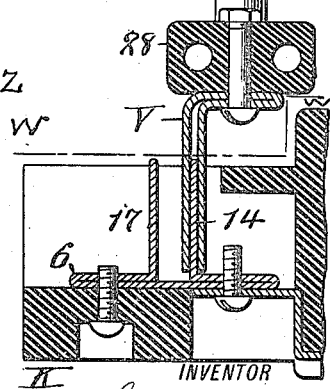
INVENTOR
Thomas E. Murray
BY
ATTORNEY

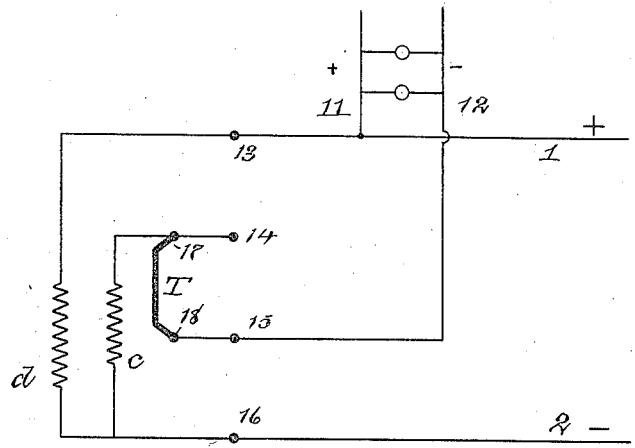
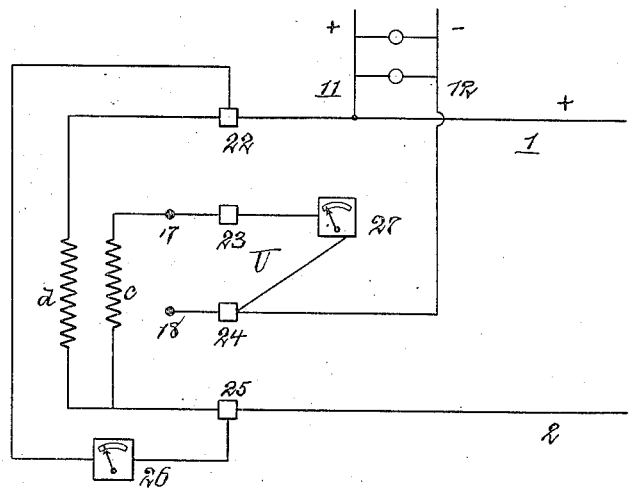
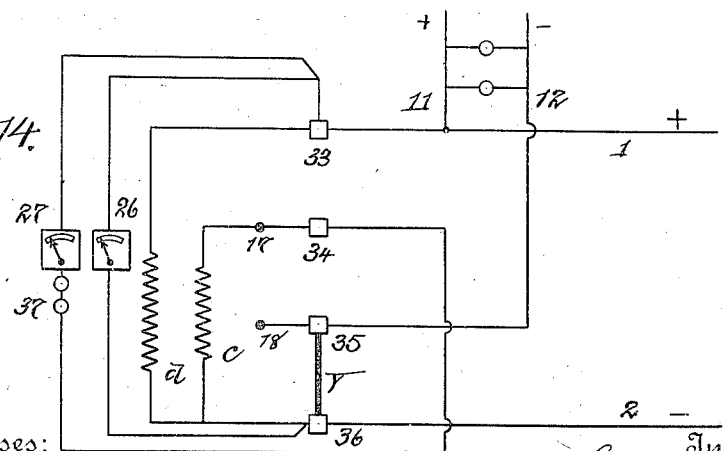

UNITED STATES PATENT OFFICE.

THOMAS E. MURRAY, OF NEW YORK, N. Y.

METER-TESTING SERVICE CUT-OUT.

991,004.	Specification of Letters Patent.	Patented May 2, 1911.

Application filed December 8, 1909. Serial No. 532,049.

*To all whom it may concern:*

Be it known that I, THOMAS E. MURRAY, a citizen of the United States, residing at New York, in the county of New York and State of New York, have invented a certain new and useful Improvement in Meter-Testing Service Cut-Outs, of which the following is a specification.

The invention is a meter testing service cut-out for electrical installations.

It has for its object to simplify the testing of consumers' meters while in service. Hitherto this has required apparatus occupying considerable space, and more or less complicated. In all installations a cut-out (and fuses) is usually interposed between the main supply and local conductors. I combine all the necessary testing connections and certain removable switch and bridge pieces directly with the cut-out support, so that by simply applying said pieces to contacts on said support, I am enabled to establish or cut off service, to remove the meter, to test the meter on customer's load, or to test the meter with artificial load; the meter removal and testing being, in each case, accomplished without interruption of the customer's service.

Figure 9:
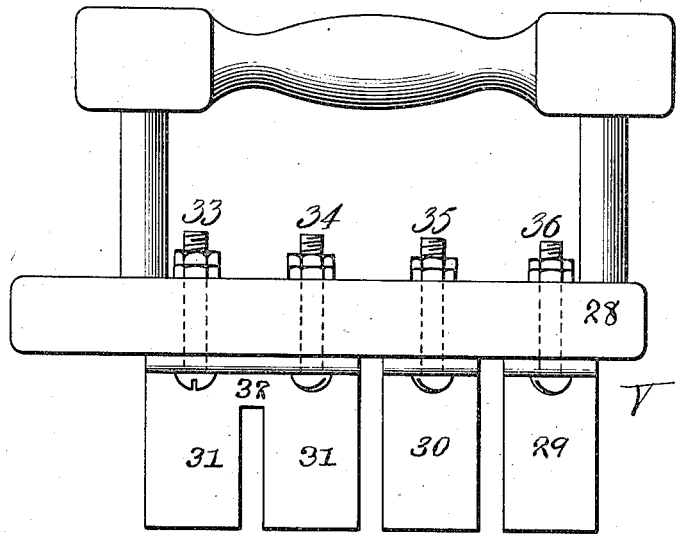
Figure 10:
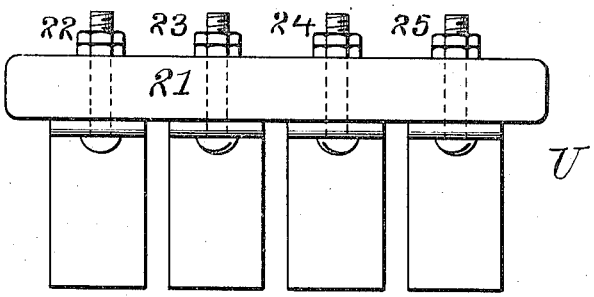
Figure 11:
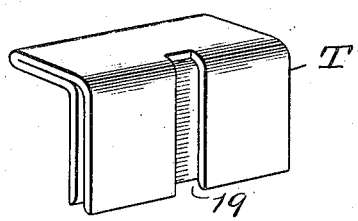

In the accompanying drawings—Figure 1 is a plan view of my meter testing service cut-out, the fuse cases and removable bridge and switch pieces being absent. Fig. 2 is a section on the line $x, x$, of Fig. 1 showing a fuse case in place. Figs. 3, 4 and 5 are horizontal sections of the projection K respectively on the lines $y, y$, of Fig. 6, $z, z$, of Fig. 7, and $w, w$, of Fig. 8. Figs. 6, 7 and 8 are vertical sections of the projection K showing the removable switch and bridge pieces in place, taken respectively on the lines $y', y'$, of Fig. 3, $z', z'$, of Fig. 4, and $w', w'$, of Fig. 5. Fig. 9 is an elevation of the switch piece V. Fig. 10 is an elevation of the switch piece U, and Fig. 11 is a perspective view of the bridge piece T. Figs. 12, 13 and 14 are diagrams—Fig. 12 illustrating the service connections of the cut-out, Fig. 13 the standardizing apparatus arranged for testing the meter on normal or customer's load without interruption of service, and Fig. 14 the standardizing apparatus arranged for testing the meter with artificial load without interruption of service.

Similar numbers and letters of reference indicate like parts.

A is the base block, or support, preferably formed of insulating refractory material, such as porcelain. In said block are four sockets, B, C, D, E, in each of which is secured a metal plate having its ends bent upwardly to form spring contact arms. The main supply conductors 1, 2 enter the block through passages F in a wall thereof, and are respectively connected to the plates in sockets C, E. Fuse plugs, one of which is shown at H, Fig. 2, also of porcelain or like material, containing fuses having their terminals connected in the usual way to end contact plates I, fit in the sockets B, C and D, E, and establish electrical connection with the spring arms therein.

On the block A is a projection K in which are four recesses, L, M, N, O. In said recesses are metal strips 5, 6, 7, 8. The strip 5 connects with the spring arms in socket B—dotted lines Fig. 1. The strip 7 is connected to a strip 9 which extends through a diagonal channel on the under side of the block, passes through a wall and enters a recess P in a horizontal projection Q on said wall. The strip 8 connects with the spring arms in socket D. The spring arms in socket B are also connected to a strip 10 which enters a recess R in projection Q. The conductors 11, 12 which supply current to the local or customer's installation are connected respectively to the strips 9 and 10. On the strips 5, 6, 7, 8 are upwardly extending contact plates 13, 14, 15, 16 which are in line across the projection K. On the strips 6, 7 are upwardly extending contact plates 17, 18, parallel to the plates 14, 15. The partition S between the recesses M, N does not extend to the outer ends of said recesses.

In order to make the service connection, the contact plates 17, 18 are bridged by a removable bridge piece T, Fig. 11, having spring clip arms which receive said contact plates between them. One side of the piece T is slotted, as shown at 19, to receive the end of the short partition S, Fig. 3. The two parts of the piece on each side of the slot bear respectively against the inner sides of the contact plates 17, 18, while the unslotted and parallel part of the plate bears on the outer sides of said plates. The upper portion 20 of the piece may be bent over, as shown, to form a convenient means for grasping the piece in the fingers, to apply it to or remove it from the contact plates 17, 18.

In Figs. 12, 13 and 14, the meter X, diagrammatically represented, is of well known construction, c being the armature, and d the field. Strip 5 in recess L of the cut-out support is connected to one field terminal strip 8 in recess O to the other field terminal, and one armature terminal, and strip 6 in recess M to the other armature terminal. Strip 7 and strip 5 being connected, as already described, to the local conductors 11, 12, it is obvious that a gap is produced in one part of the circuit, namely, between strips 6 and 7; and that this gap may be closed by placing the bridge piece T upon the contact plates 17, 18. Hence all that is required to establish or break the customer's circuit is to apply the bridge piece T to the contact plates 17, 18, or to remove the same therefrom. See Fig. 12.

I will now describe the apparatus for meter testing.

I. *Testing on customer's load without interruption of service.*—For this purpose I employ the removable switch piece U, Fig. 10. This comprises a holder 21 of wood or other non-conductor, from which depend four separated metal spring clips secured in place by the binding screws 22, 23, 24, 25. To the screws 22, 25 are connected the terminals of the voltmeter 26, and to the screws 23, 24 are connected the terminals of the ammeter 27. The service connections being as shown in Figs. 6 and 12, and the bridge piece T being in place, the clips of switch piece U are adjusted upon the contact plates 13, 14, 15, 16. After this is done the switch piece T is removed. The conditions are then as shown in Figs. 7 and 13, the local circuit being closed through the measuring instruments (Fig. 13): from plus main conductor to local conductor, across the load indicated by the lamps to minus local conductor, plates 24, to ammeter 27, to plates 23, meter armature c, to plates 25 and minus main conductor. The meter field coil d is in shunt from plus main conductor to plates 22, plates 25 and minus main conductor. Particular attention is called to the fact that no interruption of service is here caused, since the testing circuit is closed by the switch piece U before the switch piece T is removed.

II. *Testing with artificial load and without interruption of service.*—For this purpose I provide the removable bridge piece V, having a suitable handle and shown in Fig. 9. This comprises a holder 28 of wood or other non-conductor, from which depend a spring clip 29, a spring clip 30, and spring clips 31 bridged at 32. The last named clips are preferably formed and bridged by slotting a single plate, as shown in Fig. 9. The clips are secured in place by the binding posts 33, 34, 35, 36. The terminals of the circuit, including the artificial load 37 and ammeter 27, are connected to the binding posts 33, 34, and the terminals of the voltmeter 26 are connected to the binding posts 33, 36. The bridge piece T being in place, the piece V, as shown in Figs. 5 and 8, is applied, so that the contact plates 13, 14, 15, 16 are received in the clips. After this is done the bridge piece T is removed. The circuits are then as follows (Fig. 14): from plus main conductor to plus local conductor, across the load indicated by the lamps, to minus local conductor, plates 35, bridge V to minus main conductor. Plates 33 and 36 are connected respectively to plus and minus main conductors, and between them proceed the following shunts: from plate 33 to ammeter 27 and artificial load 37, to plate 34, meter armature c and plate 36. From plate 33 to voltmeter 26 and plates 36. From plate 33 to meter field coil d and plate 36.

The apparatus may also be arranged so as to enable the meter to be removed without interruption of service. All that is required to this end is to place both the bridge piece T and the switch piece V in their respective positions, as already described. In Fig. 14 the dotted lines indicate the bridge piece T thus used conjointly with switch piece V.

I claim:

1. In combination with service line conductors, local conductors, standardizing apparatus, a meter and a support, contact terminals on said support in the meter circuit, a removable bridge piece coöperating with said terminals, a removable switch piece, contact terminals on said support coöperating with said switch piece, and circuit connections as set forth, whereby when said bridge piece is in place circuit is closed to the meter and said local conductors, and when said switch piece is in place and said bridge piece removed circuit is closed to said meter, said standardizing apparatus and said local conductors.

2. The combination in an electric cut-out support having a plurality of separate recesses, circuit terminal plates in said recesses, contact plates extending outwardly from said terminal plates and disposed in line across said recesses, main and branch conductors, circuit connections between said terminal plates and said conductors, and a removable bridge piece constructed to be received upon two of said contact plates.

3. The combination in an electric cut-out support having a plurality of separate recesses, circuit terminal plates in said recesses, contact plates extending outwardly from said terminal plates and disposed in line across said recesses, main and branch conductors, circuit connections between said terminal plates and said conductors, a holder, a plurality of clips thereon constructed to be received respectively upon said contact plates, and means on said holder for connecting said clips in circuit.

4. The combination in an electric cut-out support having a plurality of separate recesses, circuit terminal plates in said recesses, contact plates extending outwardly from said terminal plates and disposed in line across said recesses, main and branch conductors, circuit connections between said terminal plates and said conductors, a holder, a plurality of clips thereon, two of said clips being constructed to be received respectively upon two of said contact plates, and two of said clips being constructed to be received upon and to bridge the remaining two of said contact plates, and means on said holder for connecting said clips in circuit.

In testimony whereof I have affixed my signature in presence of two witnesses.

THOMAS E. MURRAY.

Witnesses:
GERTRUDE T. PORTER,
MAY T. MCGARRY.